Feb. 10, 1931. W. H. GREEN 1,792,220
ZEOLITE REGENERATING PROCESS
Filed Dec. 13, 1926
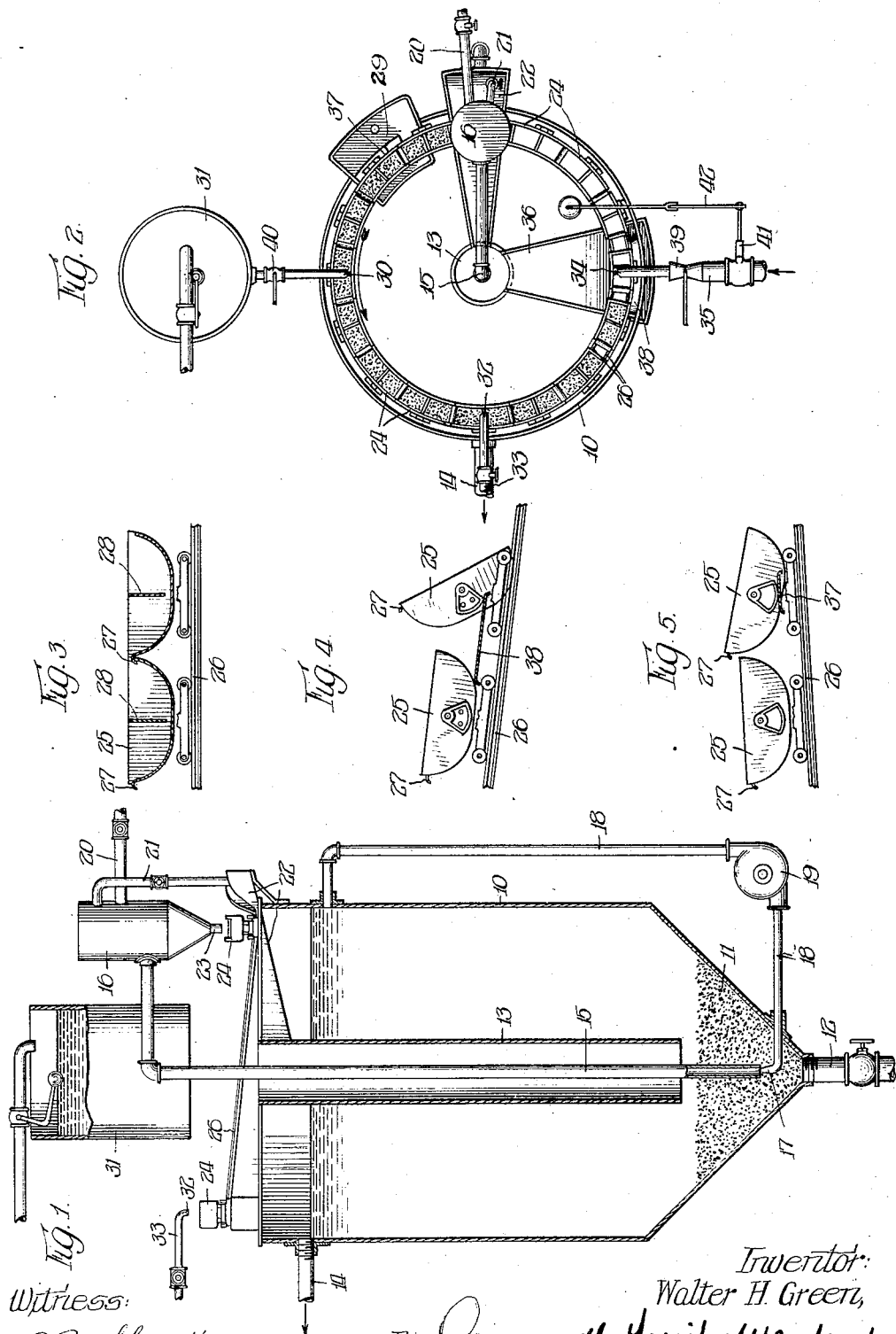

Patented Feb. 10, 1931

1,792,220

UNITED STATES PATENT OFFICE

WALTER H. GREEN, OF CHICAGO, ILLINOIS, ASSIGNOR, BY MESNE ASSIGNMENTS, TO THE PERMUTIT COMPANY, OF NEW YORK, N. Y., A CORPORATION OF DELAWARE

ZEOLITE-REGENERATING PROCESS

Original application filed July 19, 1924, Serial No. 726,930. Patent No. 1,752,339, dated April 1, 1930. Divided and this application filed December 13, 1926. Serial No. 154,366.

This invention relates to the art of softening water by the base exchange or zeolite method and has particular reference to procedure for effecting economies in operation and maintenance through better utilization of the zeolites and of the regenerating solution, this application relating to subject matter divided out of my application Serial No. 726,930, filed July 19, 1924, now Patent #1,752,339 dated April 1, 1930.

Heretofore in the softening of water by the base exchange method it has been customary to provide a casing, either open or closed, supplied with a bed of zeolites disposed on a suitable support, the dimensions of the bed being determined by the hardness of the water to be softened, the quantity of soft water required during a stated period, the density and capacity of the zeolites used, and the rate of flow permissible through the casing. In the operation of a typical softener of the prior art, hard water and a sodium chloride solution for regenerating the zeolites are passed alternately through the bed of zeolites, suitable valves and piping being provided to direct and control the respective flows.

In some cases the flow of hard water and of the regenerating solution has been downward through the zeolites, in other cases upward, and in still other instances the hard water is passed downwardly and the regenerating solution upwardly. In the exchange of bases which is brought about to soften water, the calcium and magnesium in solution in the water constitute the hardening elements to be eliminated, and are withdrawn in passing through a bed of sodium zeolites, the sodium being given up by the zeolites for the calcium and magnesium in the water. In the step of regeneration, sodium is restored to the zeolites in exchange for the calcium and magnesium taken from the hard water by passing a solution of sodium chloride through the zeolites. The exchange results from mere contact and is very rapid, the chief problem heretofore having been to effect contact throughout the bed.

In regeneration, the general practice has been to pass through the bed a sodium chloride solution of uniform strength at a calculated rate of flow, in some cases the bed being treated for several hours. Satisfactory and economical regeneration has not been achieved, due to the length of time required, the waste of unused salt and the failure to regenerate evenly and uniformly throughout the bed.

I have found that economies in time and space, the cost of installation, maintenance and operation, and particularly in the consumption of salt, may be effected by departing from the idea of intermittently regenerating a stationary bed of zeolites, and by modifying the practice of bringing fresh regenerating solution into contact with zeolites in varying stages of exhaustion.

The principal object of the invention is to provide a process for softening water in which the regeneration of the zeolites is done automatically, without interrupting or interfering with the delivery of softened water and in such manner that in the formation and introduction of brine for regenerating purposes, the potentially stronger portion of the solution is presented to zeolites only slightly contaminated while the relatively weaker portions are brought into contact with the more thoroughly exhausted zeolites. In other words the regeneration is carried on in accordance with the counter-current principle.

That the invention may be better understood a form of apparatus for carrying on the invention is illustrated in the accompanying drawings. Other forms of apparatus embodying useful principles of construction and operation may occur to those skilled in the art as being equally suitable for carrying on the purposes of the invnetion. The disclosure herein is to be understood as being for the purpose of exemplification and not in any sense a suggestion that other forms of apparatus are not possible or contemplated within the spirit and scope of the invention as defined in the appended claims.

In the drawings—

Fig. 1 is a vertical section taken diametrically through one form of apparatus;

Fig. 2 is a plan view of the same;

Fig. 3 is a vertical section taken longitudinally through two of the receptacles used in the regeneration of the zeolites;

Fig. 4 is a side elevation of two of the receptacles when at that point on the track where each of the receptacles in turn is tilted; and Fig. 5 is a side elevation of two of the receptacles when at that point on the track where each of the receptacles in turn is partially tilted.

The water-softening portion of the apparatus includes a casing 10 having a conical bottom 11 which terminates centrally in a normally closed clean-out conduit 12. The casing 10 is provided interiorly with an open-ended stack 13 which extends downwardly to a point adjacent the bottom of the casing. The hard water and the active zeolites are introduced into the top of the stack by means which will be hereinafter described, and the water is as a result softened effectively by contact with the diffused zeolites during the downward movement of the mixture in the stack. When the water and the zeolites emerge from the bottom of the stack into the bottom of the casing, the then softened water moves upwardly in the casing to a point adjacent the top of the same where it leaves through a softened water conduit 14, and the exhausted zeolites, together with any foreign solids introduced into the stack with the hard water, collect in the bottom of the casing.

The zeolite-regenerating portion of the apparatus includes a conduit 15 which extends upwardly through the stack, from a point below the surface of the exhausted zeolites in the bottom, where the conduit opens, to a point above the casing, where the conduit discharges its contents into a small separating tank 16. The exhausted zeolites in the bottom of the casing are caused to move upwardly in the conduit 15 by means of a constricted flow of water which is directed into the lower end of the conduit 15 from an injector nozzle 17. The nozzle 17 is mounted adjacent the entrance of the conduit 15 on the lower end of a conduit 18, which leads upwardly on the outside of the casing and communicates with the interior of the same at a point below the surface of the softened water therein. A suitable pressure pump 19 is included in the conduit 18 for effecting a rapid flow of water through the same.

The tank 16, which receives the exhausted zeolites and the water used to elevate the same, is provided with a conduit 20 through which the foreign solids mixed with the zeolites in the casing are carried off to a sewer. A conduit 21 is provided above the waste conduit 20 through which the bulk of the water entering the tank is returned to the casing by way of an inclined trough 22 leading into the stack 13, and with a bottom orifice 23 through which the exhausted zeolites, which settle to the bottom, are discharged into a moving zeolite conveyor 24.

The conveyor 24 consists of a plurality of wheeled receptacles 25 (see Figs. 3, 4 and 5) which are serially linked together and travel about a circular track 26 on the top of the casing 10. Each receptacle has a lip 27 at one end which laps over the adjacent end of the adjoining receptacle, and has a transverse baffle 28 between its ends which is spaced from its bottom, whereby, when a liquid is poured into the uppermost of several receptacles which are supported on an inclined portion of the track, same will flow through each of such receptacles in a tortuous course extending alternately over the lips and below the baffles. Any suitable means may be used for moving the receptacles about the track, and such movement may be either continuous or intermittent, depending upon the manner in which the associated portions of the apparatus are designated to operate. Each receptacle, in its movement about the track, passes first below the orifice 23 of the tank 16, then over a catch basin 29 which empties into the sewer, then up a gradual inclination to a point below a nozzle 30 which is connected with a regenerating solution tank 31, then further up the inclination to a point below a nozzle 32 which is connected with a wash water conduit 33, then down an inclination to a point below a nozzle 34 which is connected with the main hard water conduit 35 and above a wide trough 36 which opens into the top of the stack 13, and then back again to the starting point below the orifice 23. Each receptacle is tiltable on its under carriage, and is caused to tilt slightly by means of a trip 37 when it passes over the catch basin 29, as shown in Fig. 5, and to tilt fully by means of a trip 38 as it passes below the nozzle 34, as shown in Fig. 4.

The receptacles 25 receive the exhausted zeolites as they pass below the orifice 23 of the tank 16, and subsequently discharge the regenerated zeolites as they pass above the trough 36, the regeneration of the zeolites taking place during the movement of the receptacles about the track below the nozzles 30 and 32. As each receptacle passes below the nozzle 30, it receives therefrom a certain amount of the regenerating solution, which solution then flows back through the following receptacles to a point above the catch basin 29, where the partial tilting of the particular receptacle then above such basin causes the solution to flow from the receptacles into the basin. As each receptacle subsequently passes below the nozzle 32, it receives therefrom a quantity of wash water, which water then flows back through the following receptacles, causing the regenerating solution therein to be first diluted and then washed completely from the zeolites in the receptacles, the wash water flowing back through the receptacles with the solution to the point above the catch basin where it is discharged into the sewer. When the receptacles pass beyond the nozzle 32, the zeolites contained therein are regenerated to the desired extent, and, when the receptacles reach the nozzle 34, they are wholly tilted and the stream of hard water from the nozzle washes the zeolites out of the receptacles and into the trough 36, from which the mixture of hard water and regenerated zeolites descend into the stack 13, where the softening of the water is effected in the manner previously described.

The regeneration of the zeolites is carried on in accordance with the counter-current principle that is to say, the zeolites when placed in the receptacles 25 have been exhausted of their sodium content and are heavily laden with calcium and magnesium. Consequently upon first encountering the sodium chloride regenerating solution which is that which has passed through and been weakened by the less partially regenerated zeolites in preceding receptacles, the sodium is readily and completely taken from the solution, thus utilizing its regenerative power to the fullest extent. Conversely the introduction of the solution in its full strength is to zeolites in the forward receptacles, which have been partially regenerated. In this case the relatively small amount of calcium and magnesium is quickly exchanged for the sodium of the solution, thus insuring the highest degree of softening activity for the zeolites.

A larger amount of calcium and magnesium is removed from the zeolites by each unit of the regenerating solution when the zeolites are relatively exhausted, and economy may accordingly be effected in the use of the regenerating solution by not bringing into contact with the zeolites sufficient solution to completely regenerate the same but only enough to react with the most easily removable portions of the calcium and magnesium. If sufficient solution be passed through a quantity of exhausted zeolites to completely regenerate the same, approximately 3/4 of the calcium and magnesium will be exchanged for sodium and carried off by the first 1/3 of the solution. The remaining 1/4 of the calcium and magnesium is relatively difficult to remove, and economy in time and materials may be effected by not attempting to remove the same but by re-using the zeolites in a still partially exhausted condition.

The amount of regenerating solution flowing from the nozzle 30 into each receptacle may be proportionately controlled with respect to the amount of hard water flowing from the nozzle 34 into the apparatus by means of a Venturi tube 39 adjacent the nozzle 34 which is operatively associated with a pressure actuated valve 40 adjacent the nozzle 30, and the amount of hard water flowing through the nozzle 34 may in turn be controlled by means of a valve 41 which is actuated by a float mechanism 42 in the casing 10.

The operation of the form of the apparatus illustrated may be summarized briefly as follows:

The hard water and active zeolites are introduced into the top of the stack 13 and the softening of the water is effected in the stack during the downward movement of the mixture therein. When the mixture emerges from the bottom of the stack the softened water moves upwardly in the casing and leaves the same through the conduit 14, and the exhausted zeolites collect in the bottom of the casing and are removed therefrom by the injector 17 which discharges such zeolites into the dividing tank 16. From the tank 16 the exhausted zeolites are discharged into the receptacles 25 of the conveyor, and the receptacles carry the zeolites first through a flow of regenerating solution and then through a flow of wash water. After the zeolites in the receptacles have been regenerated by such treatment, the receptacles tilt below the hard water inlet 34, and the hard water and zeolites flow together through the trough 36 and into the top of the stack 13, where the softening is effected.

In the process herein disclosed for regenerating the zeolites, the regenerating solution washed from the regenerated zeolites by the flow of washing and diluting water is fed by such flow to the following zeolites undergoing regeneration, and a great saving is thus effected in the use of the regenerating solution since any of the solution is not used to its fullest extent is brought into contact with other zeolites to complete its action.

I claim:

1. The process of regenerating zeolites, which comprises subjecting the exhausted zeolites to the action of substantially exhausted diluted brine containing but small quantities of salt and then to the action of brine solutions of gradually increasing salt concentrations.

2. The process of regenerating zeolites, which comprises subjecting the exhausted zeolites to the action of a brine solution containing large quantities of hardening salts in solution and then subjecting it to the action of brine solutions of gradually increasing brine concentration and gradually decreasing hardening salt concentration.

3. The process of regenerating zeolites, which comprises moving the zeolites and the regenerating solution in different directions in contact with each other, whereby to effect counter-current regeneration of the zeolites.

4. The process of regenerating zeolites, which comprises moving the zeolites and the regenerating solution in opposite directions in continued contact with each other throughout a substantial distance, whereby to effect counter-current regeneration of the zeolites.

5. The process of regenerating zeolites, which comprises moving substantially continuous streams of the zeolites and the regenerating solution in opposite directions in continued contact with each other throughout a substantial distance, whereby to effect substantially continuous counter-current regeneration of the zeolites.

6. The process of regenerating zeolites which comprises first subjecting a moving stream of zeolites to the action of a relatively weak regenerating solution and then to the action of a stronger regenerating solution.

7. The process of regenerating zeolites which comprises feeding the regenerating solution of the zeolites, washing the regenerating solution from the zeolites thus regenerated, and then utilizing the mixture of wash liquid and regenerating solution to dilute the fresh regenerating solution being fed to the zeolites.

8. The process of regenerating zeolites which comprises feeding the fresh regenerating solution to substantially regenerated zeolites, washing the regenerating solution from such zeolites, utilizing the mixture of wash liquid and regenerating solution to dilute the fresh regenerating solution, and then utilizing the diluted fresh regenerating solution to regenerate the more exhausted zeolites.

9. The process of claim 8 in which the diluted fresh regenerating solution is contacted with the more exhausted zeolites in such a manner that as the diluted solution decreases in regenerating strength, it is contacted with more and more exhausted zeolite.

10. The process of regenerating zeolites which comprises removing the exhausted zeolites from a water softening process, treating the exhausted zeolites so as to float off foreign materials therefrom, regenerating the exhausted zeolites by a countercurrent treatment with a regenerating solution and then returning the regenerated zeolites to the water softening process.

11. The process of regenerating zeolites, which comprises removing the exhausted zeolites from a water softening process, treating the exhausted zeolites with a diluted regenerating solution, washing the regenerating solution away from the regenerated zeolites, and utilizing the mixture resulting from this last-mentioned step for diluting the regenerating solution.

12. A process of regenerating zeolites which comprises contacting a regenerating solution with exhausted zeolites, the regenerating solution being of such strength and the time of contact of such duration so as to largely, but not completely, regenerate the zeolites and then returning the largely regenerated zeolites to a water softening process.

13. A process of revivifying exhausted zeolites which comprises placing the exhausted zeolites in suspension in a rapidly moving stream of water, separating the zeolites from said stream and then regenerating the zeolites.

14. A process of revivifying exhausted zeolites which comprises removing small portions of the zeolites from the main filter body, subjecting said zeolites to the action of a rapidly moving stream of water to separate the lighter particles therefrom, subjecting the zeolites to action of regenerating solutions of increasing strength and then replacing the zeolites in the main filter body.

15. A process of revivifying exhausted zeolites which comprises subjecting the zeolite to regenerating solutions of increasing strength and then to regenerating solutions of decreasing strength.

In testimony whereof, I have hereunto signed my name.

WALTER H. GREEN.

CERTIFICATE OF CORRECTION.

Patent No. 1,792,220.  Granted February 10, 1931, to

WALTER H. GREEN.

It is hereby certified that error appears in the printed specification of the above numbered patent requiring correction as follows: Page 1, line 90, for the misspelled word "invnetion" read invention; page 4, line 19, claim 7, for the word "of" read to; and that the said Letters Patent should be read with these corrections therein that the same may conform to the record of the case in the Patent Office.

Signed and sealed this 10th day of March, A. D. 1931.

(Seal)

M. J. Moore,
Acting Commissioner of Patents.